(12) United States Patent
Holmberg et al.

(10) Patent No.: US 7,574,093 B2
(45) Date of Patent: Aug. 11, 2009

(54) OUTSIDE PLANT ENCLOSURE WITH PIVOTING FIBER TRAYS

(75) Inventors: Matt Holmberg, Le Center, MN (US); Cindy Walters, Prior Lake, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/072,492

(22) Filed: Feb. 25, 2008

(65) Prior Publication Data

US 2008/0279522 A1 Nov. 13, 2008

Related U.S. Application Data

(63) Continuation of application No. 11/215,846, filed on Aug. 29, 2005, now Pat. No. 7,352,945.

(51) Int. Cl.
*G02B 6/00* (2006.01)
(52) U.S. Cl. ........................ 385/135; 385/134
(58) Field of Classification Search ............ 385/135
See application file for complete search history.

(56) References Cited

U.S. PATENT DOCUMENTS

| 4,792,203 | A | 12/1988 | Nelson et al. |
| 5,421,532 | A | 6/1995 | Richter |
| 5,689,606 | A | 11/1997 | Hassan |
| 5,790,741 | A | 8/1998 | Vincent et al. |
| 5,946,440 | A | 8/1999 | Puetz |
| 6,061,492 | A | 5/2000 | Strause et al. |
| 6,263,141 | B1 | 7/2001 | Smith |
| 6,360,050 | B1 | 3/2002 | Moua et al. |
| 6,418,264 | B1 | 7/2002 | Hough et al. |
| 6,438,310 | B1 | 8/2002 | Lance et al. |
| 6,496,638 | B1 | 12/2002 | Andersen |
| 6,504,988 | B1 | 1/2003 | Trebesch et al. |
| 6,810,194 | B2 | 10/2004 | Griffiths et al. |
| 6,819,857 | B2 | 11/2004 | Douglas et al. |
| 6,968,111 | B2 | 11/2005 | Trebesch et al. |
| 7,171,100 | B2 | 1/2007 | Solheid et al. |
| 2004/0175090 | A1 | 9/2004 | Vastmans et al. |
| 2004/0264873 | A1 | 12/2004 | Smith et al. |
| 2005/0100301 | A1 | 5/2005 | Solheid et al. |
| 2005/0281526 | A1 | 12/2005 | Vongseng et al. |
| 2006/0093302 | A1 | 5/2006 | Solheid et al. |
| 2006/0269205 | A1 | 11/2006 | Zimmel |

FOREIGN PATENT DOCUMENTS

WO  WO 2004/049029 A1  6/2004

*Primary Examiner*—Frank G Font
*Assistant Examiner*—Mary A El Shammaa
(74) *Attorney, Agent, or Firm*—Merchant & Gould P.C.

(57) ABSTRACT

A telecommunications cabinet includes an enclosure, a splitter mounted within the enclosure for splitting a fiber optic signal, a plurality of adjacently positioned adapter trays mounted within the enclosure, each tray being pivotable about an axis generally parallel to a longitudinal axis of the enclosure and each adapter tray housing a plurality of adapters, the enclosure also including an excess cable storage structure for storing cables that are not connected by the adapters mounted on the adapter trays, the excess cable storage structure providing a termination location for fiber optic cables without providing a continuous optical path for the fiber optic signals.

9 Claims, 22 Drawing Sheets

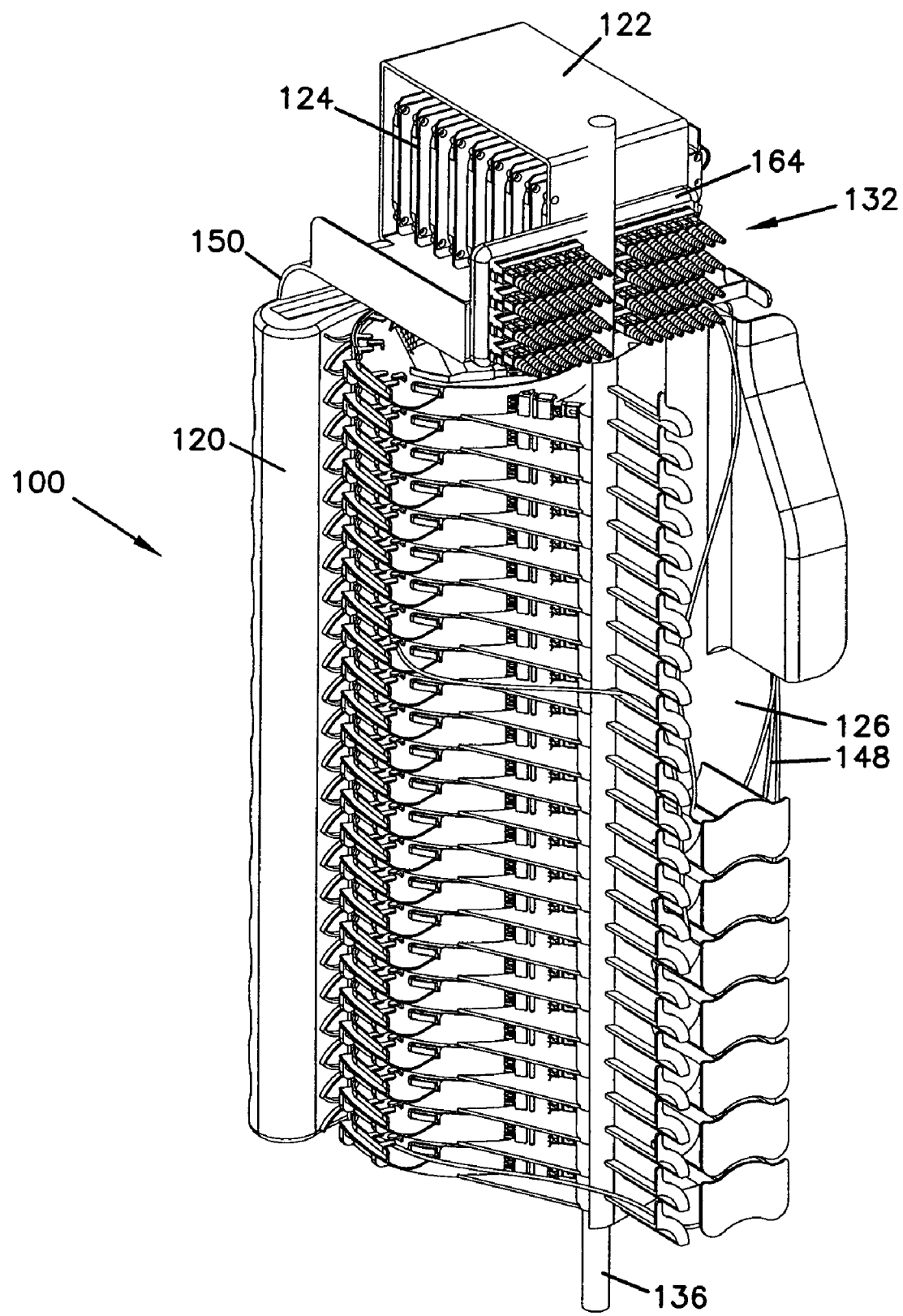

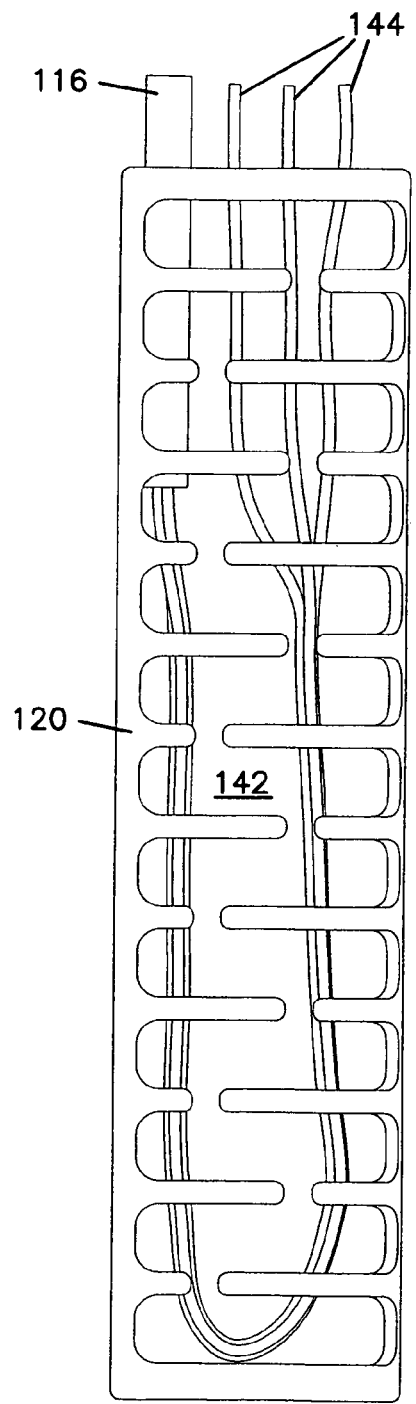
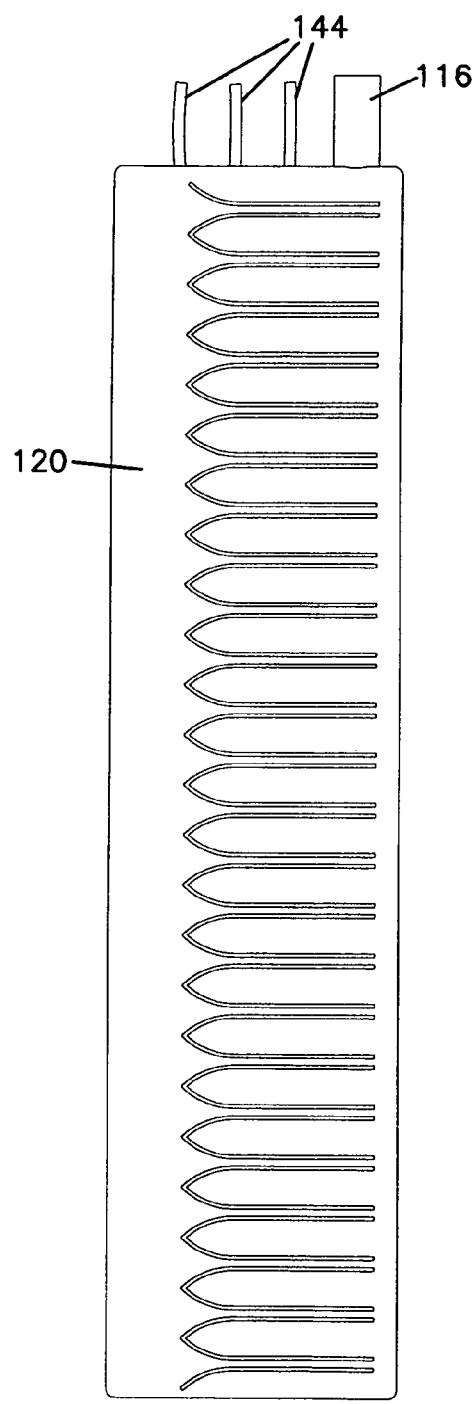

FIG.23
FIG.24
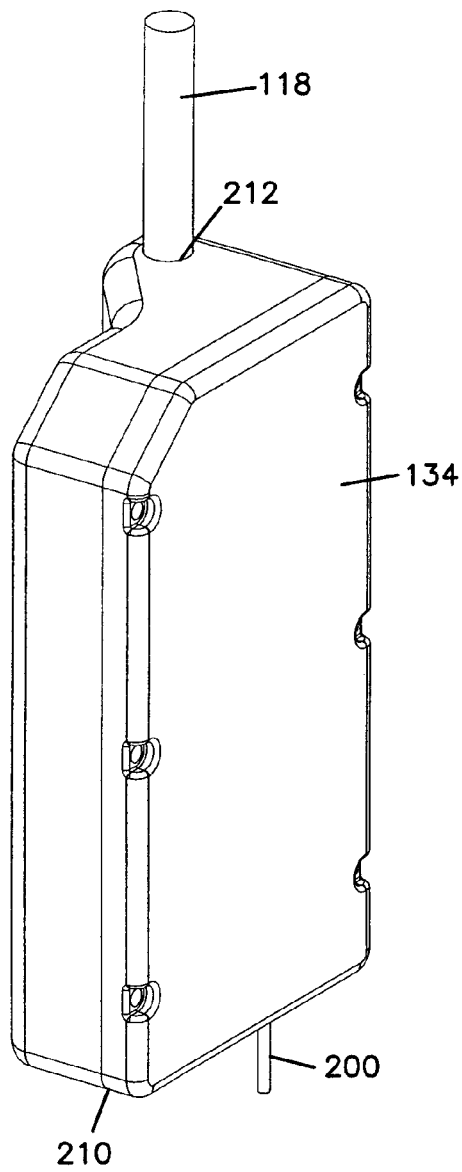
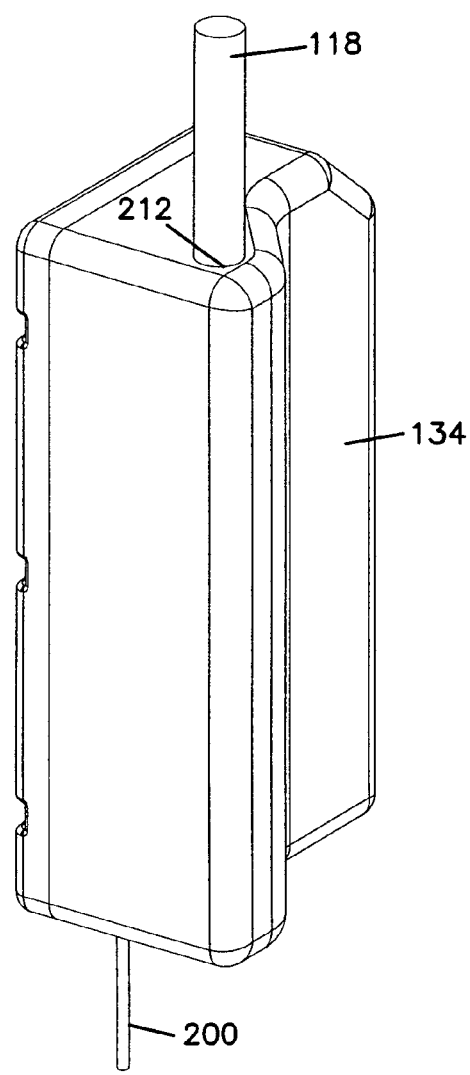

FIG.25
FIG.26
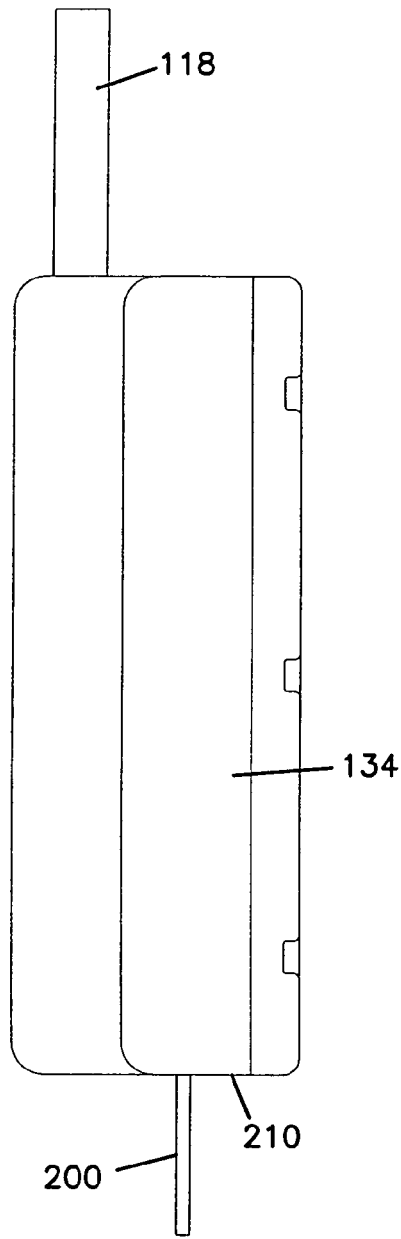
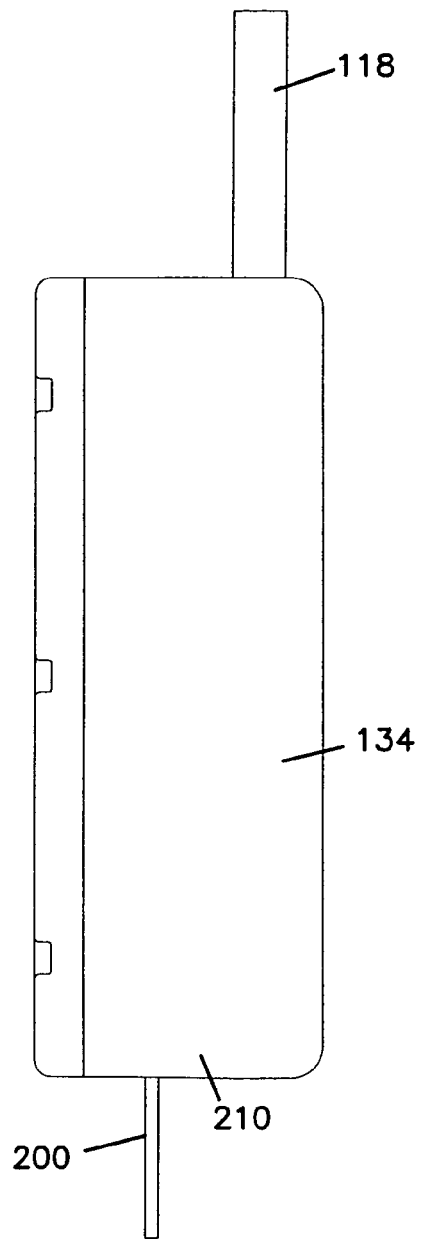

OUTSIDE PLANT ENCLOSURE WITH PIVOTING FIBER TRAYS

This application is a continuation of application Ser. No. 11/215,846, filed Aug. 29, 2005 now U.S. Pat. No. 7,352,945, which application is incorporated herein by reference.

FIELD

The present invention relates generally to fiber optic telecommunications connection devices. More specifically, the present invention relates to fixtures and cabinets for fiber optic connectors.

BACKGROUND

Outside plant (OSP) telecommunications equipment, including terminations and splitters, may be housed in protective enclosures out of doors. The enclosures may be above-ground or stored in a below-ground vault.

As demand for telecommunications services increases, optical fiber services are being extended into more and more areas. Often, it is more cost effective to provide for greater service capacity than current demand warrants. This will allow a telecommunications service provider to quickly and cost-effectively respond to future growth in demand. Often, optical fiber cables may be extended to a customer's premises prior to that customer actually requesting or needing service. Such cables may be extended to premises adjacent the premises of a current customer, as it may be cost effective to extend both cables at the same time, or the cables may be extended to new building sites in anticipation of the new occupants of those sites requesting fiber optic service.

Therefore, it is desirable to have an easily scalable solution for aiding connection of new customers to existing connections within a piece of installed connection equipment and expansion of the number of connections available within the installed equipment. It is also desirable to provide for a connection solution that can provide for a high density of connections while using little space, that limits visual pollution, and that is reliable and easy to service.

SUMMARY

The present invention relates to telecommunications management devices and methods including a plurality of cable management trays. The trays are selectively moveable out of an aligned arrangement in order to access the cables and terminations on each tray. The tray includes a first cable access location for cables entering the tray, and a second cable access location for cables exiting the tray. A pivoting cover including mounting locations for cable terminations is provided on the tray.

The present invention also relates to a telecommunications cabinet including a splitter for splitting an outside plant (OSP) cable (i.e., input cable) to a plurality of fiber distribution cables. The cabinet includes an input cable housing, a splitter housing, a cable management area, adapters for relaying the split input cables to output cables, an excess fiber distribution cable storage area, and an output cable housing.

OSP cable, after being split into distribution cables by the splitters, is directed to the cable management area. From the cable management area, the distribution cables can be directed to adapters for connection with customer equipment cables if service is desired. If service is not yet desired, the distribution cables can be directed to the excess cable storage area where connectors terminating these cables are stored and protected until a connection by the customer is desired. The adapters connecting the fiber distribution cables to customer equipment cables are housed in vertically arranged adapter trays. Each adapter tray is pivotally slidable for providing access to the connections. In addition to termination/connection capability, the adapter trays also provide cable storage/management capability.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 3 is a front right perspective view of the fiber optic telecommunications cabinet of FIG. 1, shown with an enclosure of the cabinet removed, illustrating the internal components of the cabinet;

FIG. 12 is a front elevation view of the input cable housing of FIG. 10;

FIG. 13 is a rear elevation view of the input cable housing of FIG. 10;

FIG. 23 is a front right perspective view of an output cable housing of the telecommunications cabinet of FIG. 1;

FIG. 24 is a rear left perspective view of the output cable housing of FIG. 23;

FIG. 25 is a right elevation view of the output cable housing of FIG. 23;

FIG. 26 is a left elevation view of the output cable housing of FIG. 23;

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
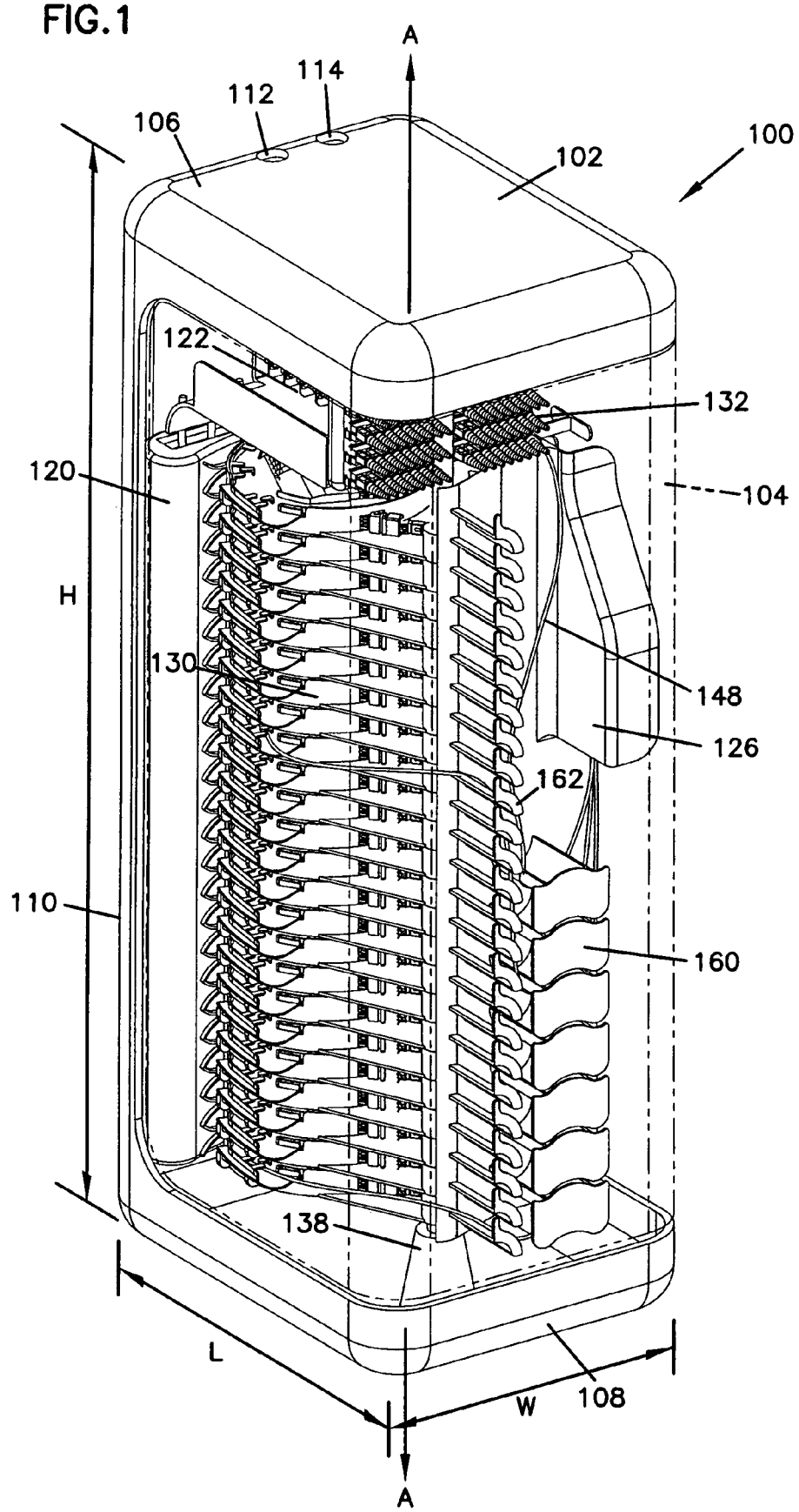
FIG. 1 is a front right perspective view of a fiber optic telecommunications cabinet having features that are examples of inventive aspects in accordance with the principles of the present disclosure, with a cover of the cabinet shown in phantom lines.
Figure 2:
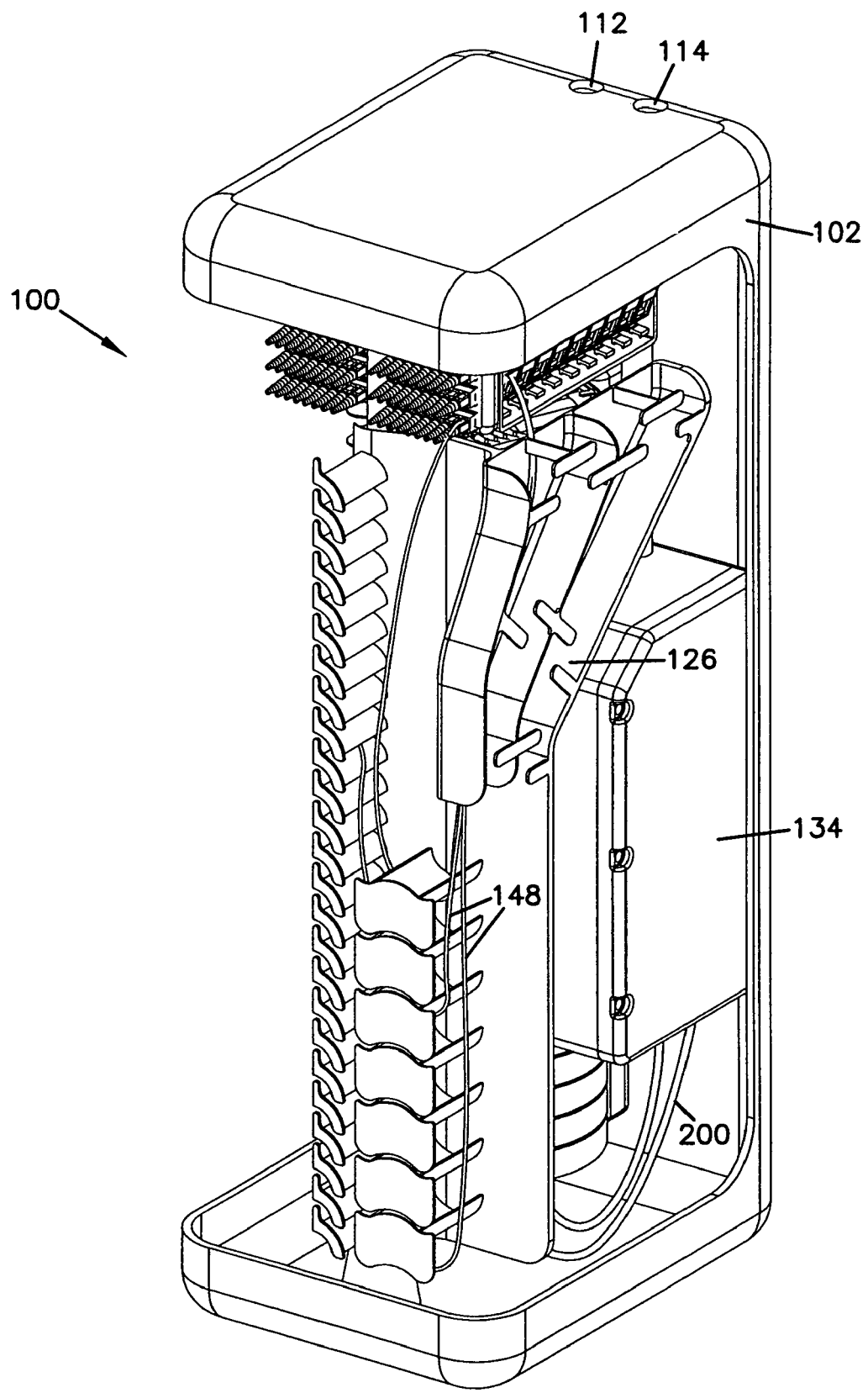
FIG. 2 is a front left perspective view of the fiber optic telecommunications cabinet of FIG. 1, shown without the cover.
Figure 2A:
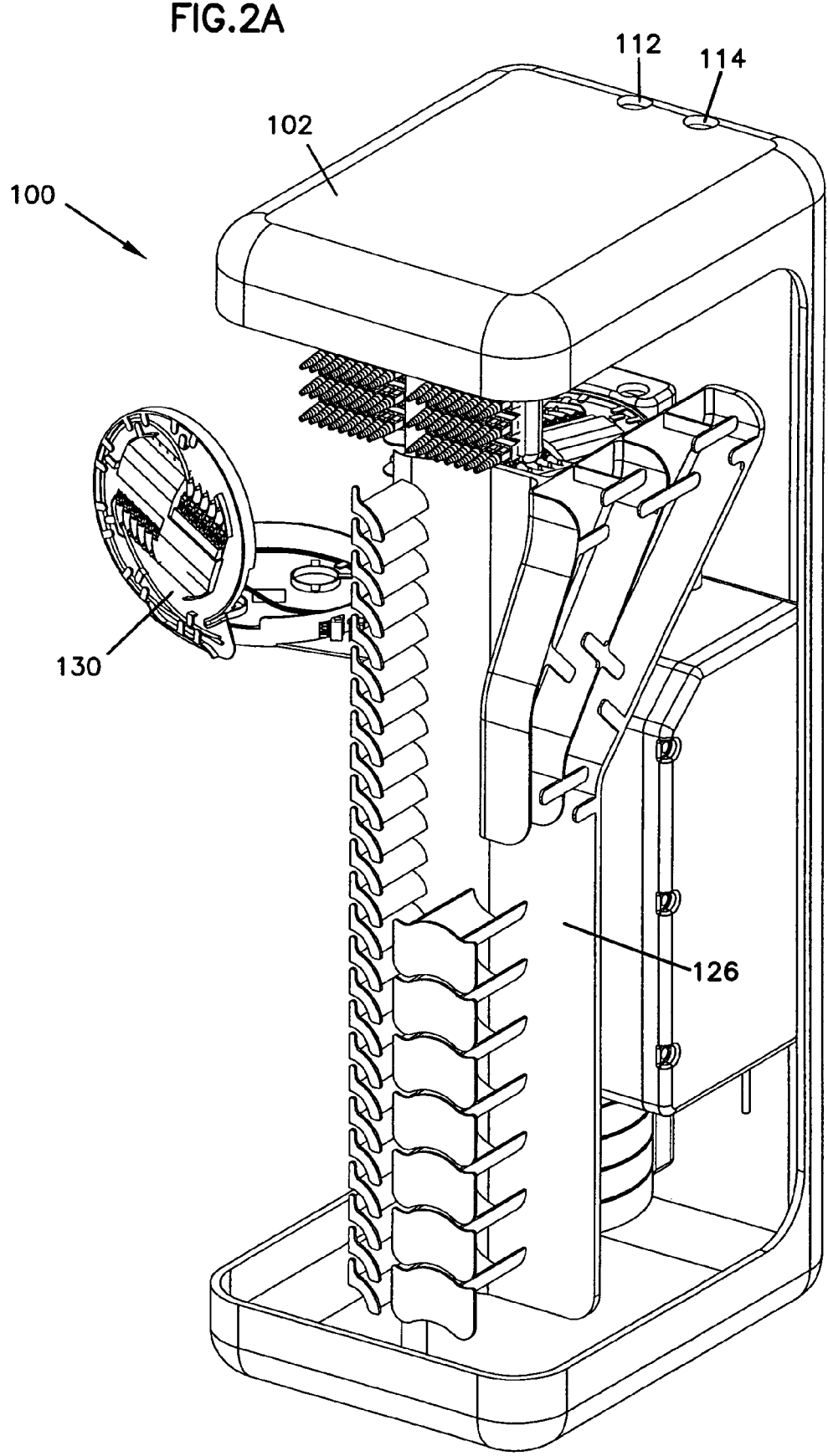
FIG. 2A is a front left perspective view of the fiber optic telecommunications cabinet of FIG. 1, illustrating one of the adapter trays in a pivoted-out position.

FIGS. 1, 2, and 2A show a telecommunications cabinet 100 having features that are examples of inventive aspects in accordance with the principles of the present disclosure. Telecommunications cabinet 100 is utilized to split a fiber optic signal of an input cable and distribute the signal via output cables. In certain embodiments, the input cable might be an outside plant (OSP) fiber optic cable and the output cable might be a collection of customer equipment cables for providing fiber optic service and connectivity at the customer's location. If used in such manner, telecommunications cabinet 100 might be mounted on a pedestal or other mount in an area where fiber optic connectivity for customers is desired. Telecommunications cabinet 100 utilizes splitters to break the signal from the input cable. Preferably, all fiber optic cables within the cabinet are terminated with connectors such that quick connections via adapters can be provided between the split input cable and the customer equipment output cables.

Referring still to FIGS. 1, 2, and 2A, telecommunications cabinet 100 includes an enclosure 102. Cabinet 100 may be provided with a cover 104 for sealing enclosure 104. Cover 104 is shown with phantom lines in FIG. 1. In one embodiment, cabinet 100 has a height H of about 3 feet, a length L of about 14 inches, and a width W of about 14 inches. Cabinet 100 defines a longitudinal axis A shown in FIG. 1.

Enclosure 102 includes a top wall 106, a bottom wall 108, and a back wall 110 interconnecting the top and bottom walls. The internal components of cabinet 100 are constructed and sized to fully fit within enclosure 102 and can be fully sealed and protected with cover 104. Top wall 106 includes a pair of openings 112, 114. Opening 112 is used to receive an input cable 116 (e.g., OSP fiber optic cable) and opening 114 is used as an outlet for an output cable 118 (e.g., collection of customer equipment cables).

FIGS. 3-6 illustrate the internal components of telecommunications cabinet 100 with enclosure 102 removed. Mounted within enclosure 102, the internal components include an input cable housing 120 for receiving input cable 116 (e.g., OSP cable), a splitter housing 122 that houses a plurality of splitters 124, a cable management structure 126 for managing cables coming from splitter housing 122, a plurality of fiber optic adapters 128 mounted on pivotally movable adapter trays 130 for connecting the split OSP signal to customer equipment, an excess fiber optic cable storage structure 132 for storing connectorized cables coming from splitters 124 that are not used for immediate connectivity, and an output cable housing 134 for splicing individual customer equipment cables into output cable 118.

Figure 4:
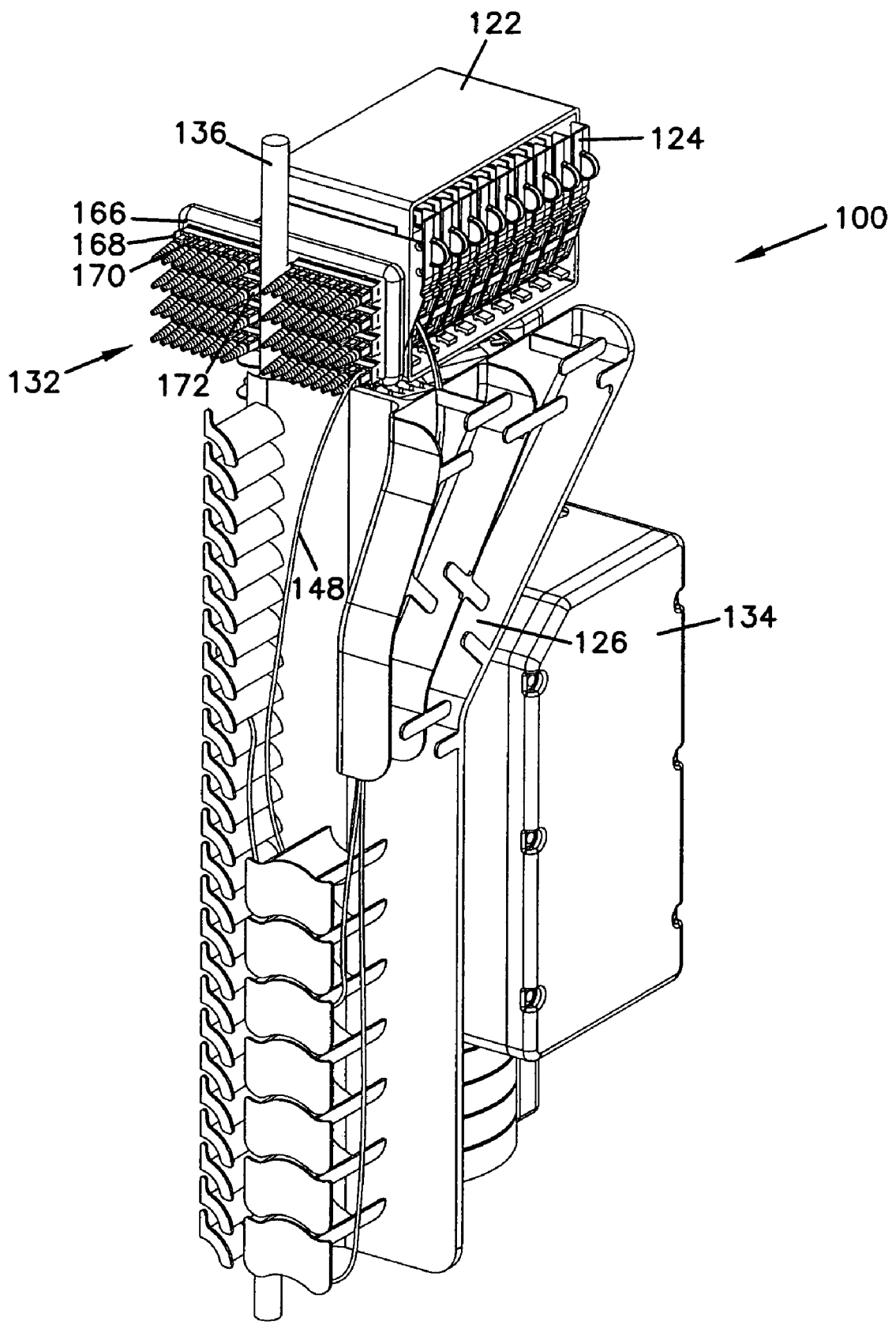
FIG. 4 is a front left perspective view of the fiber optic telecommunications cabinet of FIG. 3.
Figure 5:
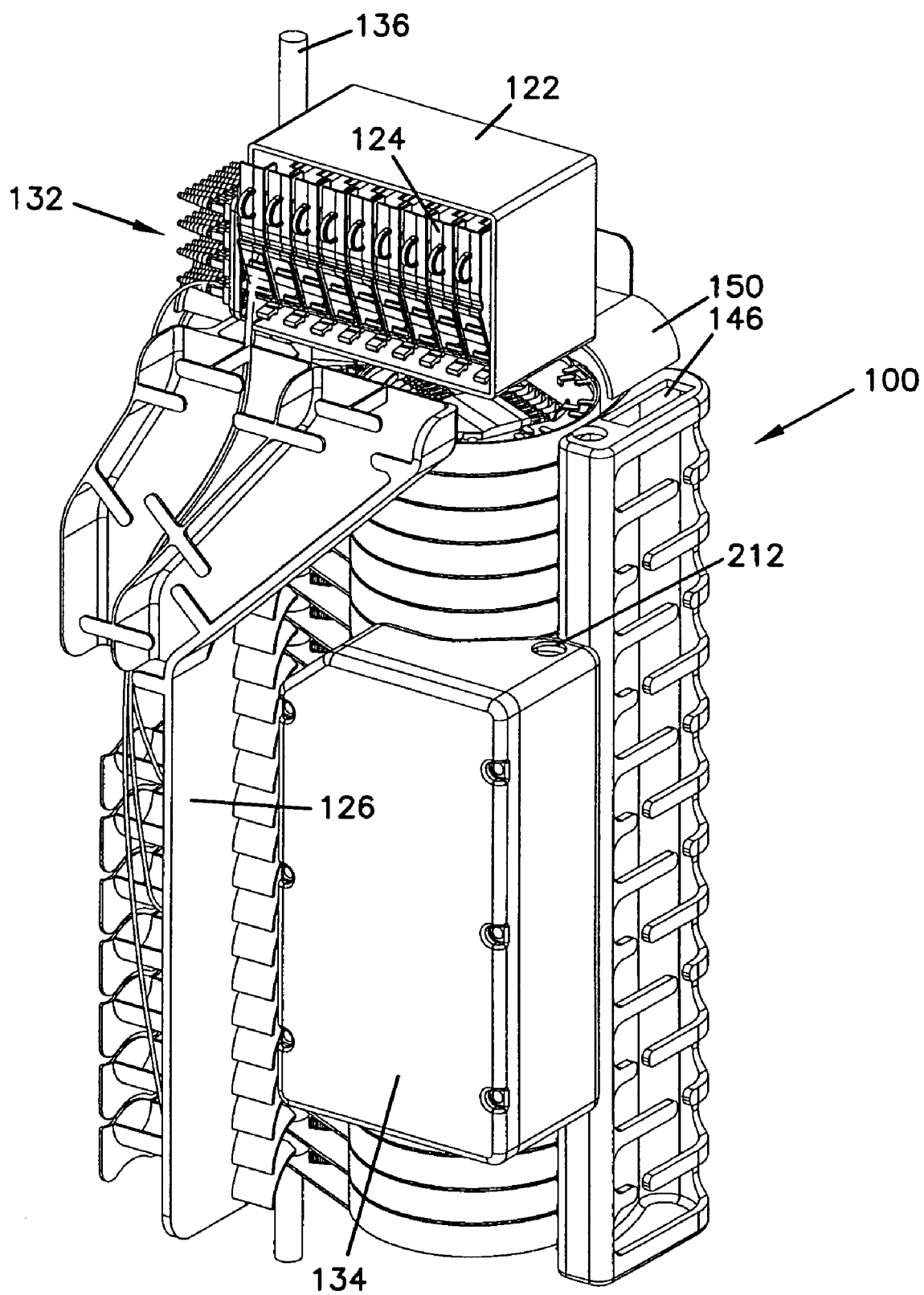
FIG. 5 is a rear left perspective view of the fiber optic telecommunications cabinet of FIG. 3.

As shown in FIGS. 3-5, the internal components of cabinet 100 are arranged around and supported by a shaft 136. Shaft 136 fits into shaft mounts 138 defined on top and bottom walls 106, 108 of enclosure 102. Only bottom shaft mount 138 is seen in FIG. 1. As will be discussed in greater detail later, shaft 136 also forms part of a hinge arrangement for providing adapter trays 130 with pivotability.

Figure 7:
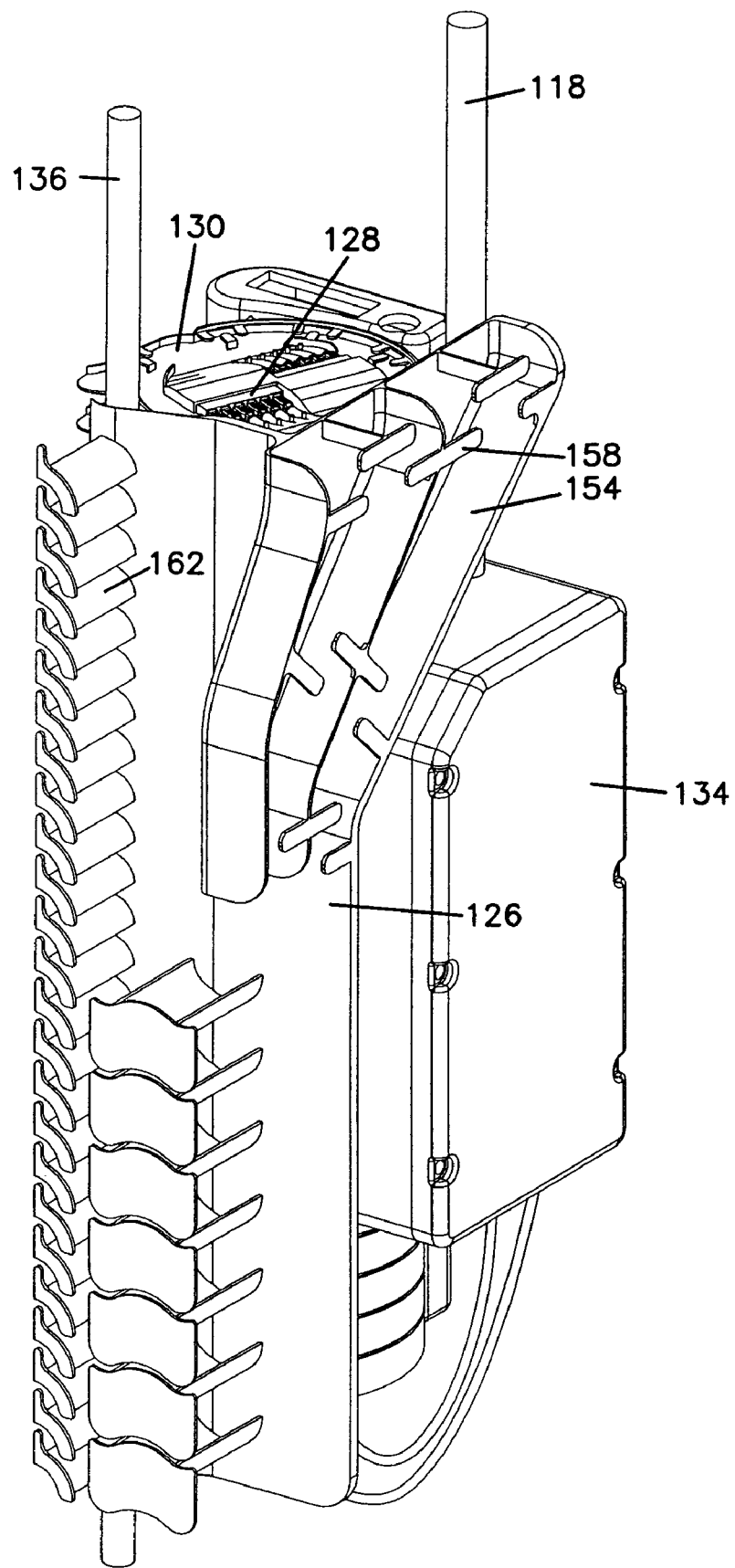
FIG. 7 illustrates a front left perspective view of the fiber optic telecommunications cabinet of FIG. 3, shown with a splitter housing and an excess distribution cable storage structure removed from the cabinet.
Figure 8:
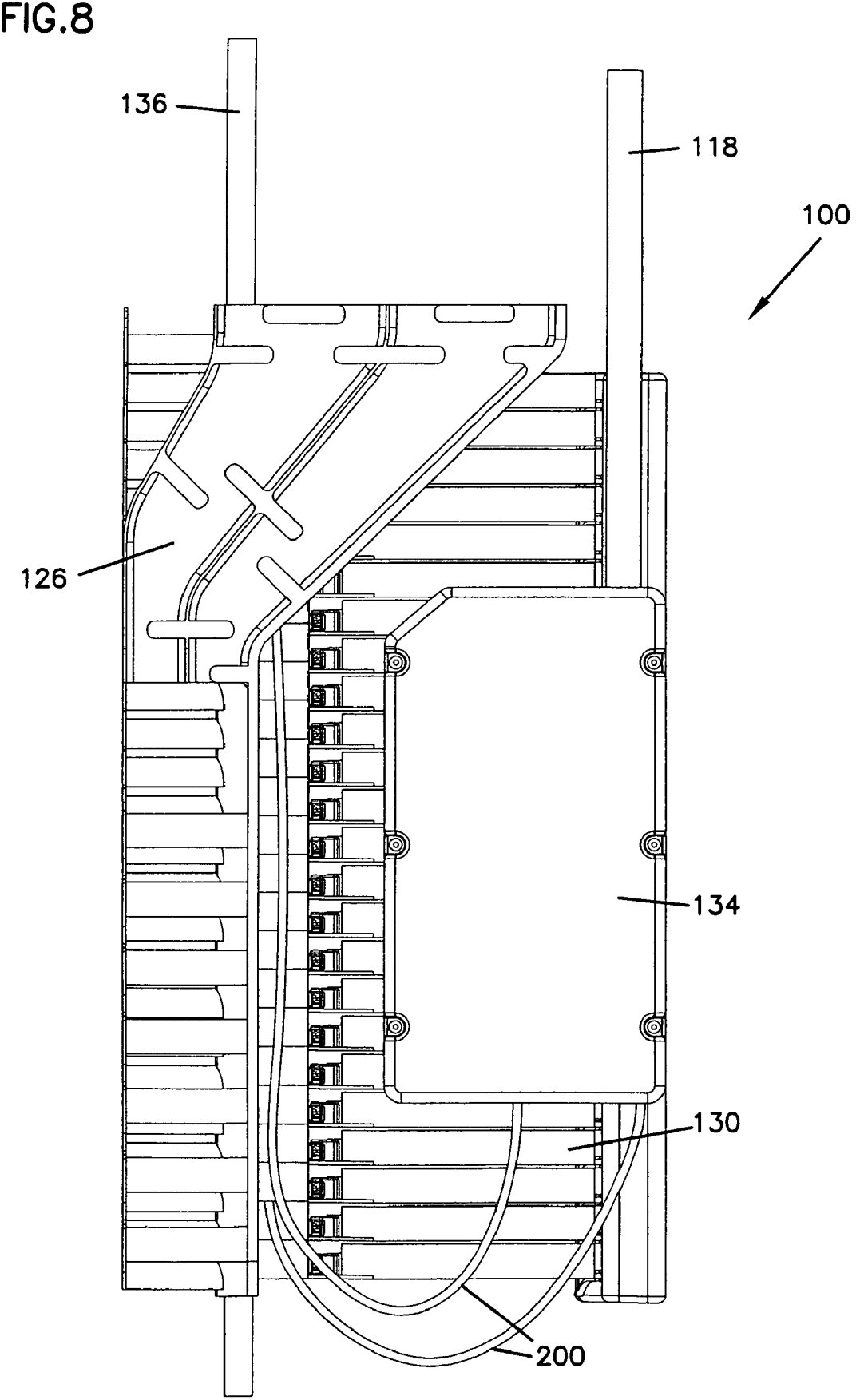
FIG. 8 is a left elevation view of the fiber optic telecommunications cabinet of FIG. 7.
Figure 9:
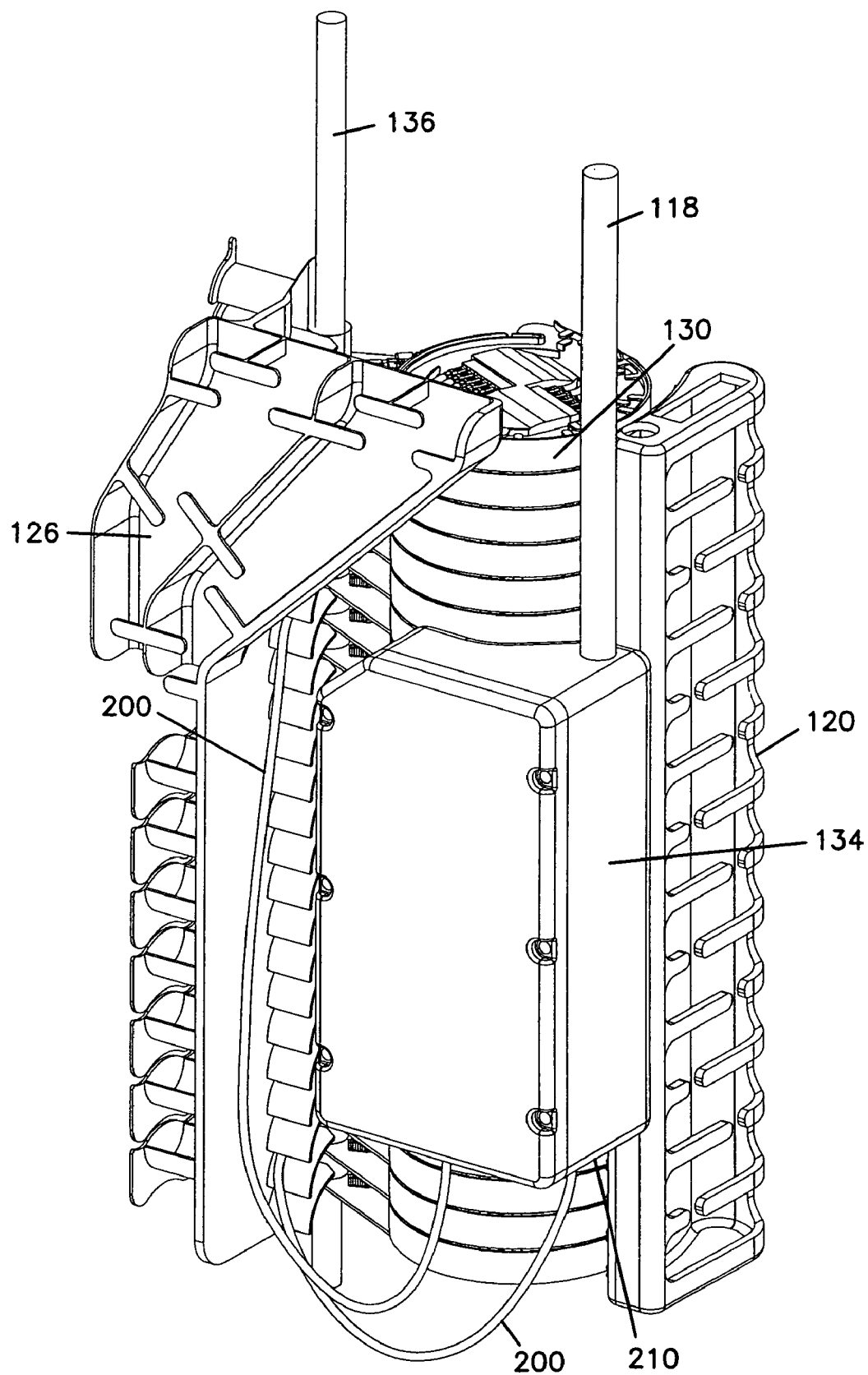
FIG. 9 is a rear left perspective view of the fiber optic telecommunications cabinet of FIG. 7.
Figure 10:
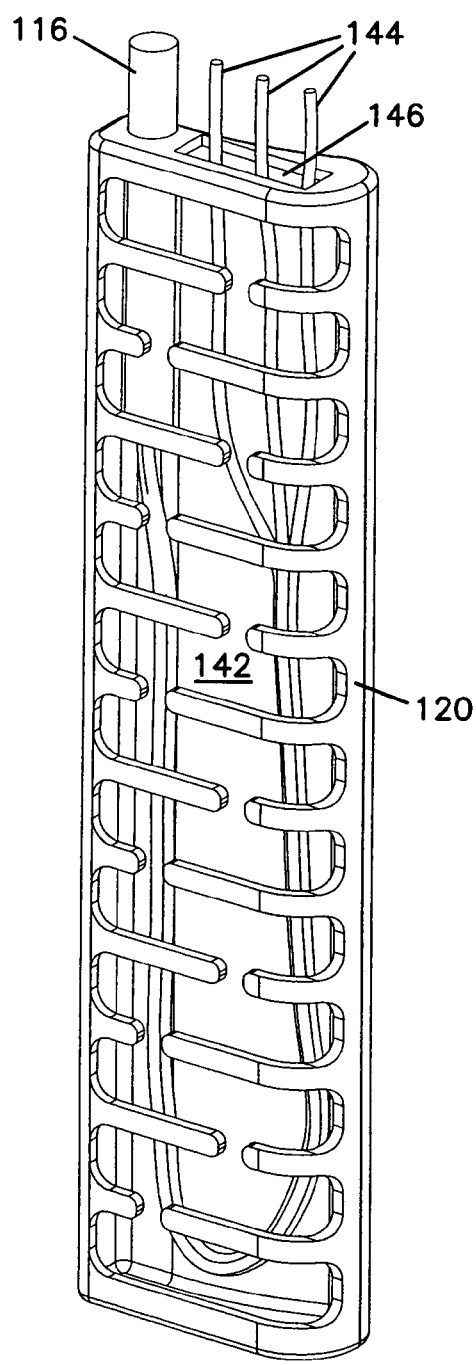
FIG. 10 is a front left perspective view of an input cable housing of the telecommunications cabinet of FIG. 1.
Figure 11:
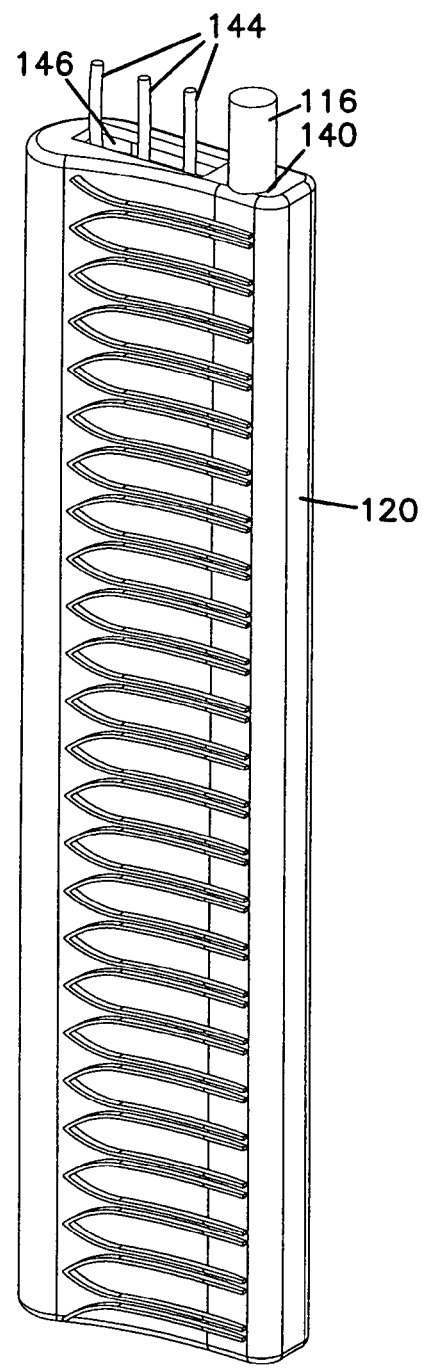
FIG. 11 is a rear right perspective view of the input cable housing of FIG. 10.
Figure 14:
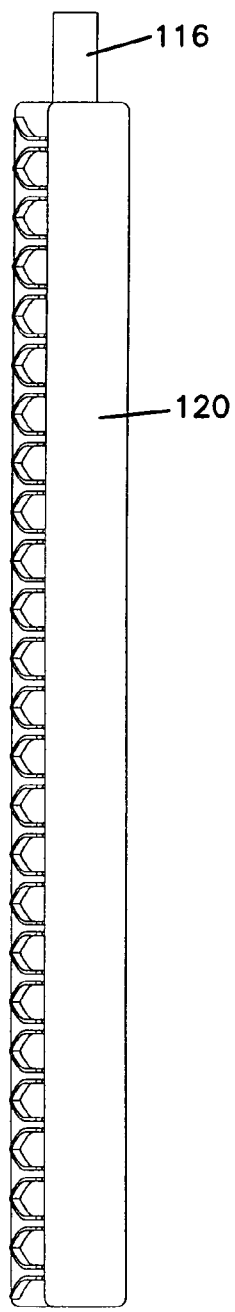
FIG. 14 is a right elevation view of the input cable housing of FIG. 10.
Figure 15:
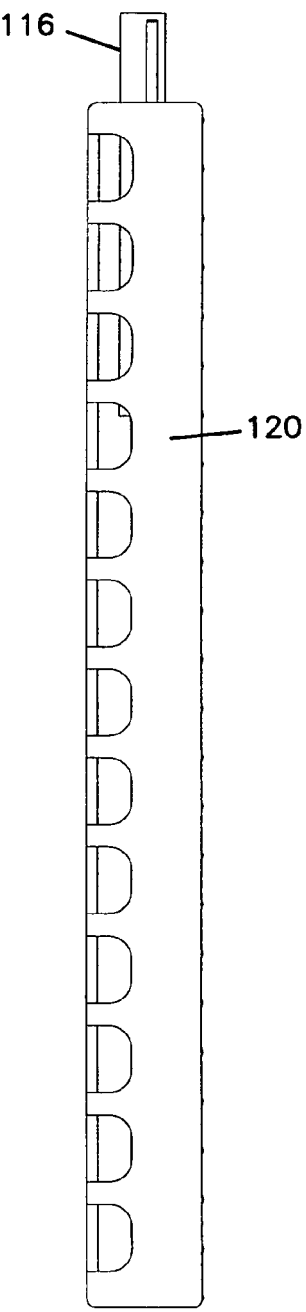
FIG. 15 is a left elevation view of the input cable housing of FIG. 10.
Figure 16:
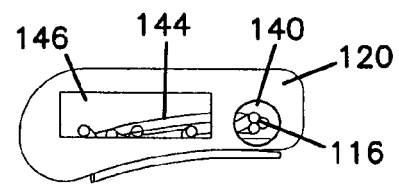
FIG. 16 is a top plan view of the input cable housing of FIG. 10.

In FIGS. 7-9, the internal components of telecommunications cabinet 100 are illustrated with splitter housing 122 and excess cable storage structure 132 removed from cabinet 100.

FIGS. 10-16 illustrate input cable housing 120 of cabinet 100. As mentioned previously, input cable 116 might be a multi-fiber OSP cable. Input cable 116 enters housing 120 through an input opening 140 defined at the top of housing 120. Input opening 140 is positioned to align with opening 112 defined on top wall 106 of enclosure 102 (see FIGS. 1-2). Input cable housing 120 defines an interior volume 142 for accommodating slack cable. Input cable 116, after being separated into multiple secondary cables 144, is directed out of housing 120 through an exit opening 146 provided at the top. Preferably, the ends of cables 144 exiting from housing 120 are terminated with connectors (e.g., SC type connectors).

After exiting input cable housing 120, connectorized secondary cables 144 are connected to inputs (not shown) of splitters 124 via adapters. Each splitter 124 separates the optical signal transmitted over a secondary cable 144 into thirty-two signals directed into an equal number of fiber distribution cables 148. Fiber distribution cables 148 are also preferably terminated with connectors. Splitters 124 are described in greater detail in commonly-owned U.S. patent application Ser. No. 11/138,063, filed on May 25, 2005, entitled "FIBER OPTIC SPLITTER MODULE," the disclosure of which is incorporated herein by reference. As illustrated in FIGS. 3 and 5, splitter housing 122 includes a radius limiter 150 adjacent exit opening 146 of housing 120 for guiding cables 144 coming from housing 120 to splitters 124.

Figure 17:
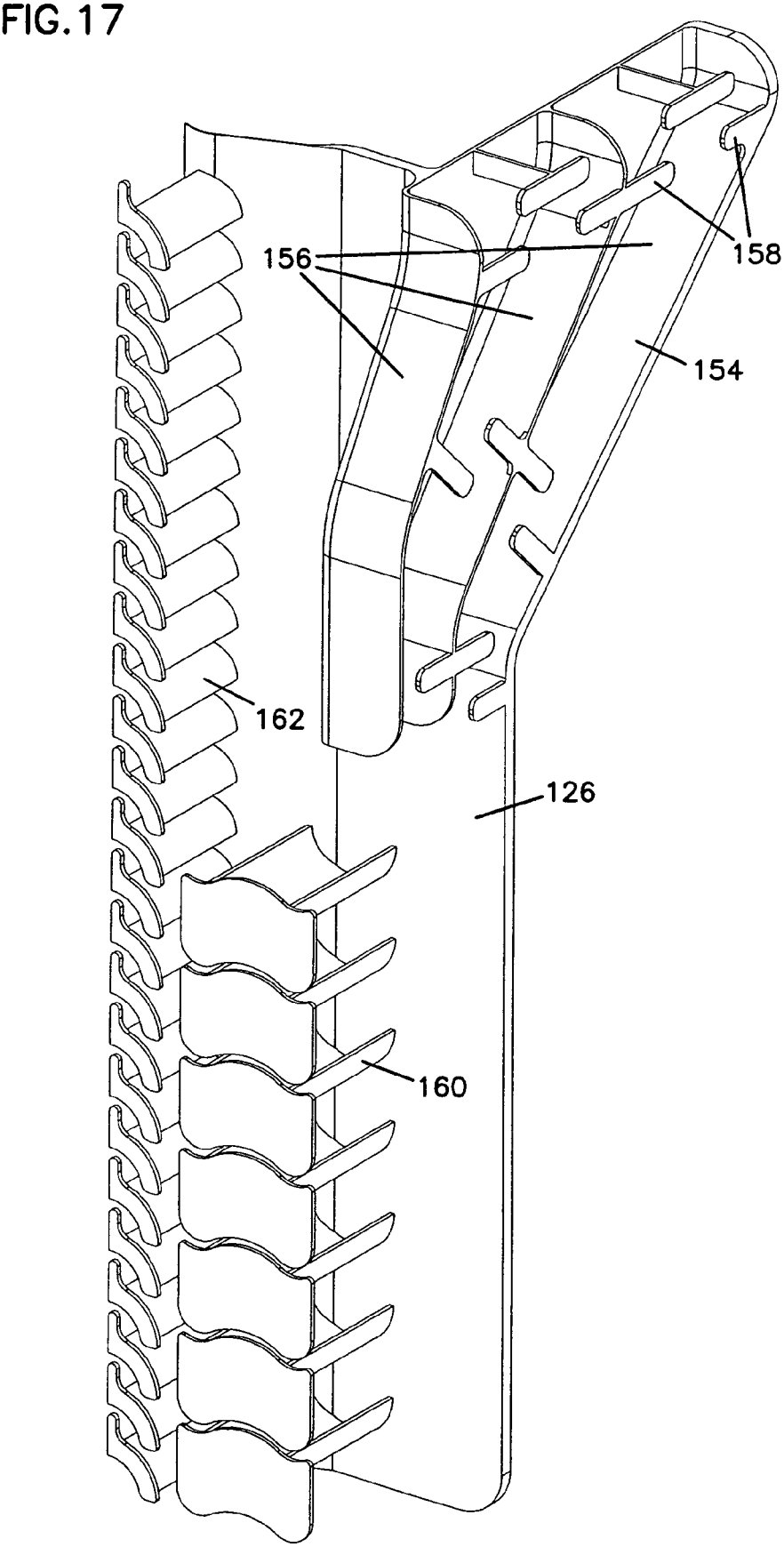
FIG. 17 is a front right perspective view of a cable management structure of the telecommunications cabinet of FIG. 1.
Figure 18:
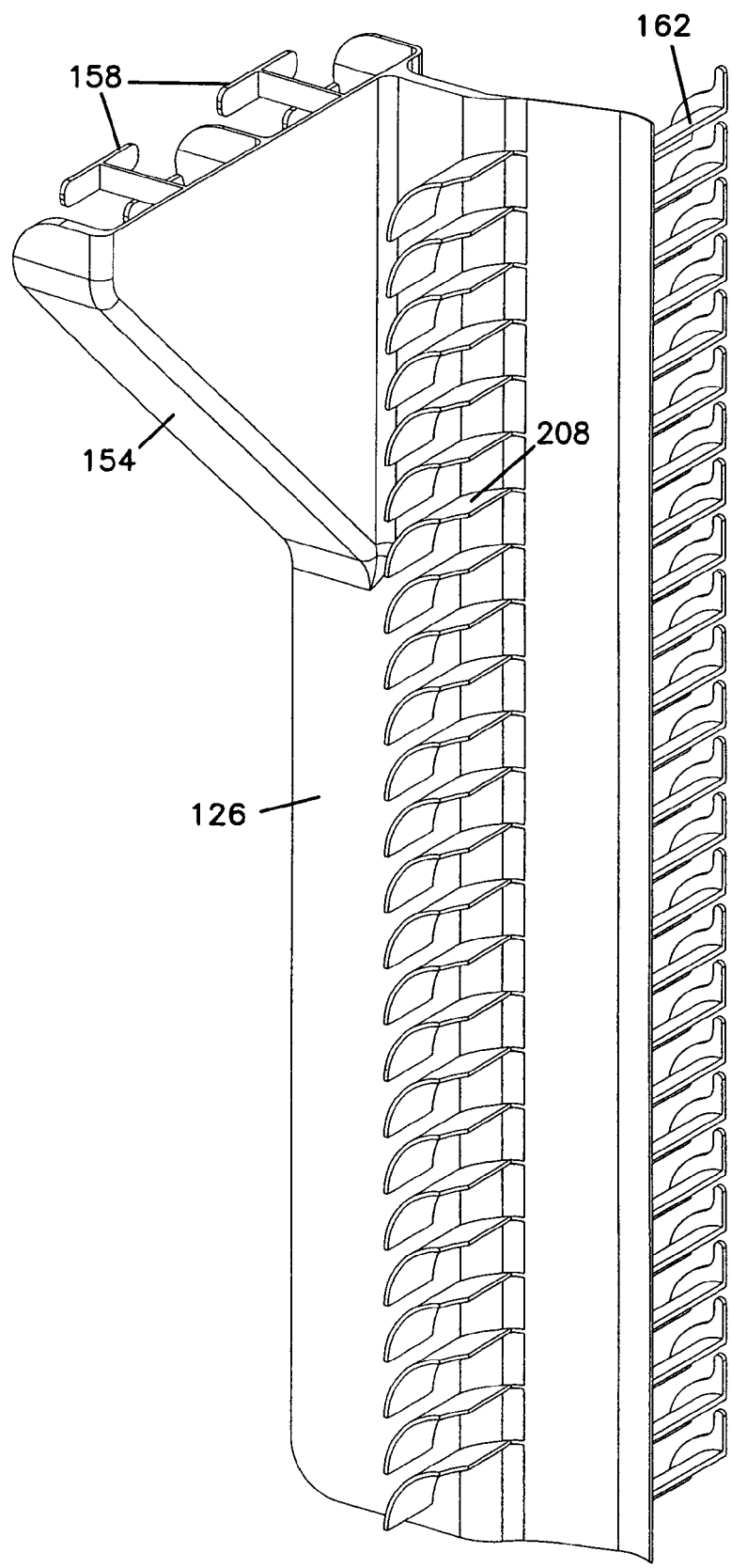
FIG. 18 is a rear left perspective view of the cable management structure of FIG. 17.

From splitters 124, fiber distribution cables 148 are directed through cable management structure 126 illustrated in FIGS. 17-18. Fiber distribution cables 148 exiting the outputs 152 of splitters 124 are first guided through a first portion 154 of cable management structure 126. First portion 154 of cable management structure 126 includes radius limiting walls 156 and fingers 158. Distribution cables 148 are then guided around spools 160 located adjacent the lower portion of cable management structure 126. After being guided around spools 160, as illustrated in FIGS. 1-4, distribution cables 148 can then be directed to either excess cable storage structure 132 or through further radius limiters 162 to adapter trays 130.

Excess cable storage structure 132 is illustrated in FIGS. 1-6. Excess cable storage structure 132 might be utilized until such time when a customer desires fiber optic service. Excess cable storage structure 132 includes a bulkhead 164 that defines mounting slots 166 for mounting connector holders 168. Each connector holder 168 may include a plurality of openings 170 for receiving and releasably holding fiber optic connectors 172. Openings 170 in connector holder 168 preferably do not provide a continuous optical path but rather house and protect a polished end face of an optical fiber within cable 148. This protection may be provided in combination with an endcap, such as shown in commonly-owned U.S. patent application Ser. No. 10/610,325, filed on Jun. 30, 2003, entitled "FIBER OPTIC CONNECTOR HOLDER AND METHOD," the disclosure of which is incorporated herein by reference. Alternatively, the connector holder may enclose and protect the polished end face of the connector terminating cable without the need for a protective endcap. Excess cable storage structure 132 and connector holder 168 are described in greater detail in commonly-owned U.S. patent application Ser. No. 10/871,555, filed on Jun. 18, 2004, entitled "MULTI-POSITION FIBER OPTIC CONNECTOR HOLDER AND METHOD," the disclosure of which is incorporated herein by reference.

For those customers desiring fiber optic connectivity, distribution cables 148 are directed to adapter trays 130 illustrated in FIGS. 19-22. Adapter trays 130 are arranged vertically within enclosure 102. In the embodiment shown, cabinet 100 includes twenty-four adapter trays 130, each one housing twelve adapters 128 for a total of two hundred and eighty-eight customer connections.

Figure 6:
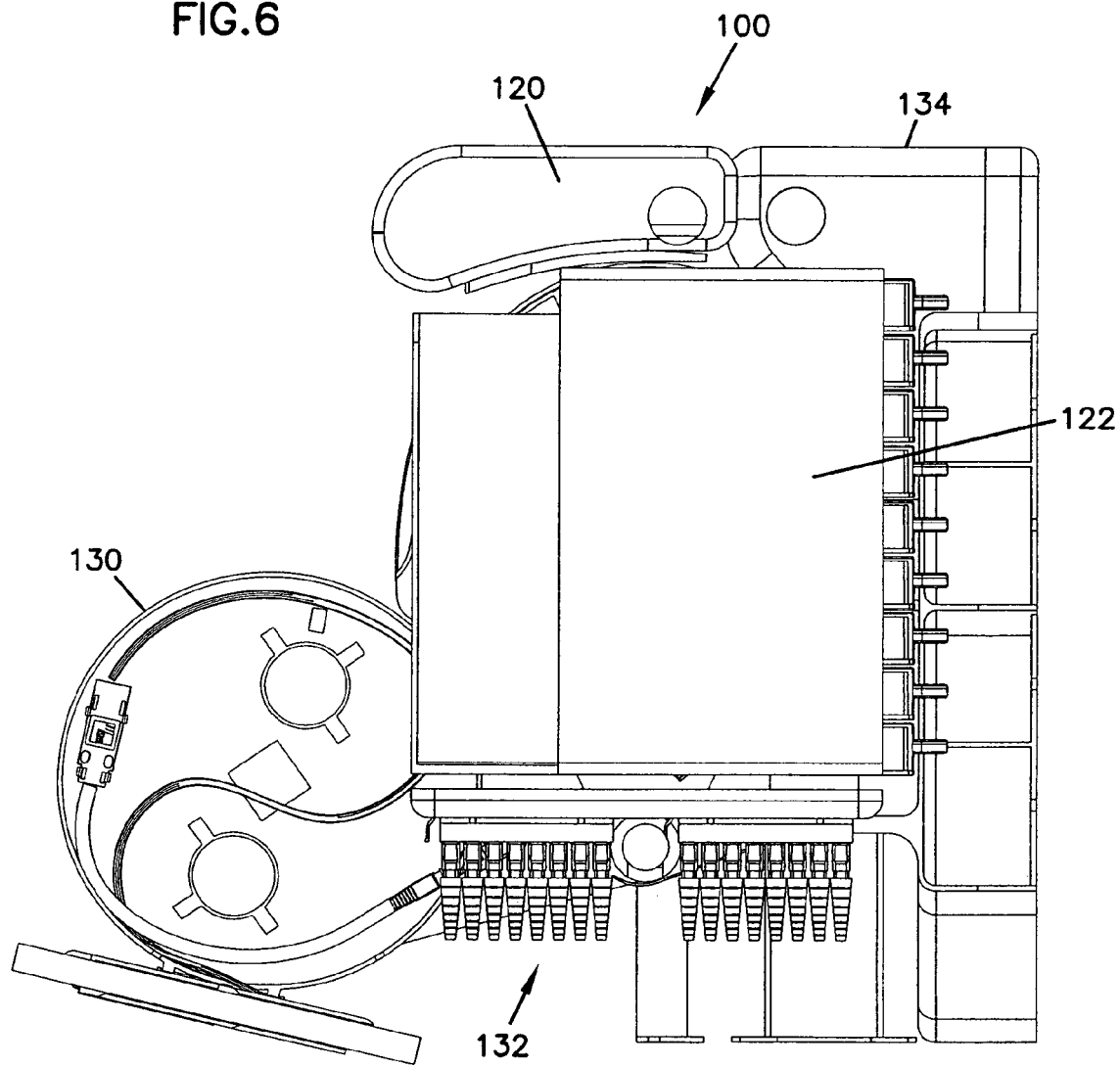
FIG. 6 is a top plan view of the fiber optic telecommunications cabinet of FIG. 3, illustrating one of the adapter trays in a pivoted-out position.

As discussed previously, each tray 130 is configured to pivotally swing out with respect to cabinet 100 to allow access to the connections on trays 130. In FIGS. 2A and 6, one of the adapter trays 130 is shown in a pivoted-out position. Adapter trays 130 are configured to pivot in the direction of the arrow 174 shown in FIG. 6.

Adapter tray 130 includes a main housing portion 176 and an extension portion 178 that includes a hinge structure 180 at one end. Hinge structure 180 is coupled to shaft 136 of cabinet 100 and forms a hinge arrangement with shaft 136 to provide for slidable, pivotal movement of tray 130 with respect to shaft 136. Hinge structure 180 and shaft 136 both include intermating rounded profiles to provide the slidable, pivotal movement.

Figure 19:
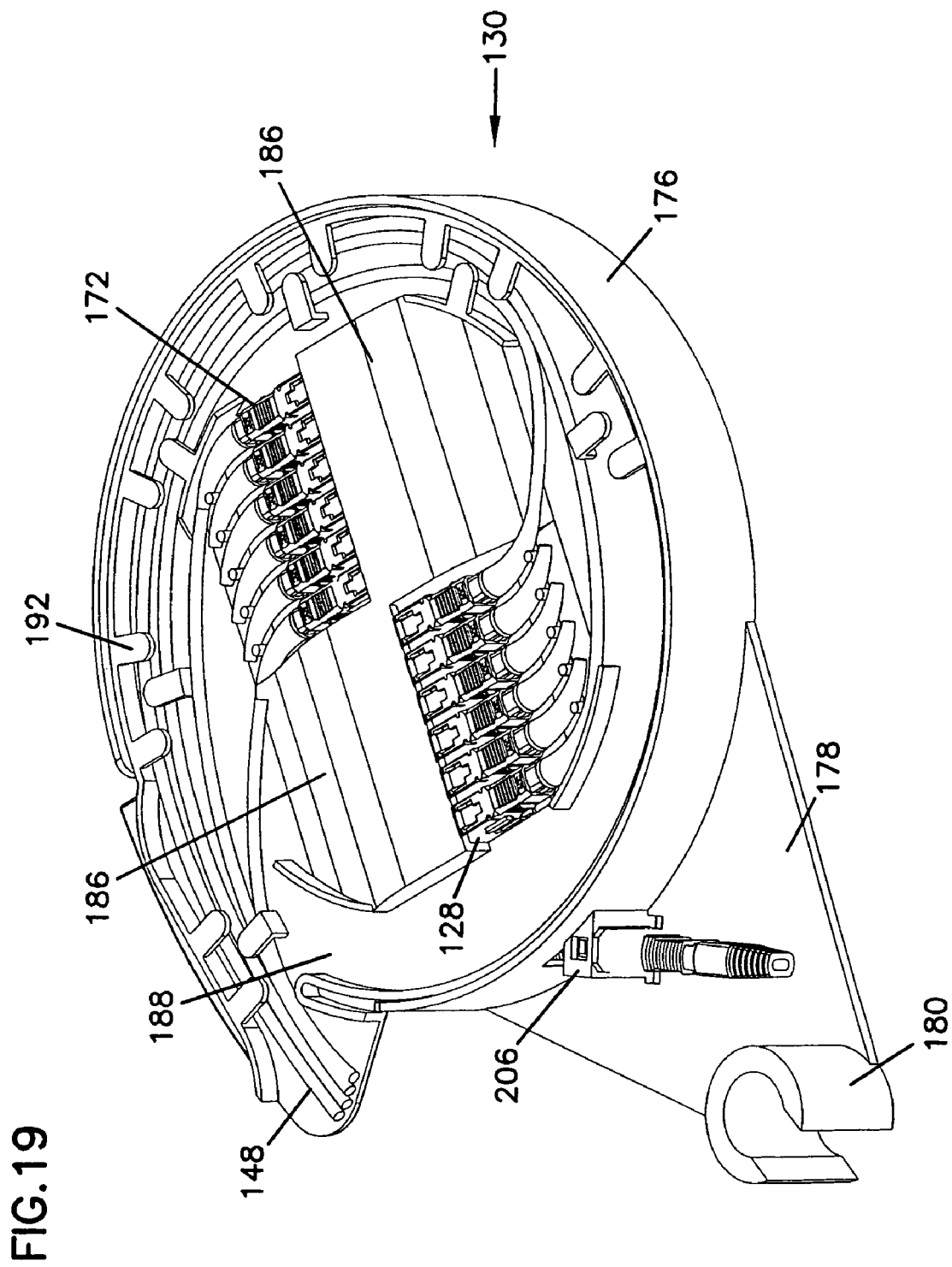
FIG. 19 is a top perspective view an adapter tray of the telecommunications cabinet of FIG. 1, the adapter tray shown with the tray cover closed.

Main housing portion 176 of adapter tray 130 provides cable storage as well as cable termination. Main housing 176 is formed from a base 182 and a hingedly connected cover 184. Cover 184 includes adapter mounts 186 that are arranged side by side in a staggered configuration, each adapter mount 186 accommodating six pairs of connectors 172. As illustrated in FIG. 19, distribution cables 148 coming from splitters 124 are connected at an upper side 188 of cover 184 and outgoing mating connectors 172 are accessible at the opposite, lower side 190 of cover 184. Connectors 172 connected on upper side 188 of cover 184 are illustrated in FIG. 19 with cover 184 in the closed position. Intermating connectors 172 mounted on lower side 190 are visible when cover 184 is in the open position as illustrated in FIGS. 20-22.

Referring to FIG. 19, distribution cables 148, after having been guided through radius limiters 162, are guided onto upper side 188 of tray 130 and guided under fingers 192 defined on upper side 188 before being connected to adapter mounts 186. Main housing 176 of tray 130 including base 182 and cover 184 are generally circular to provide radius limiting functions.

Figure 20:
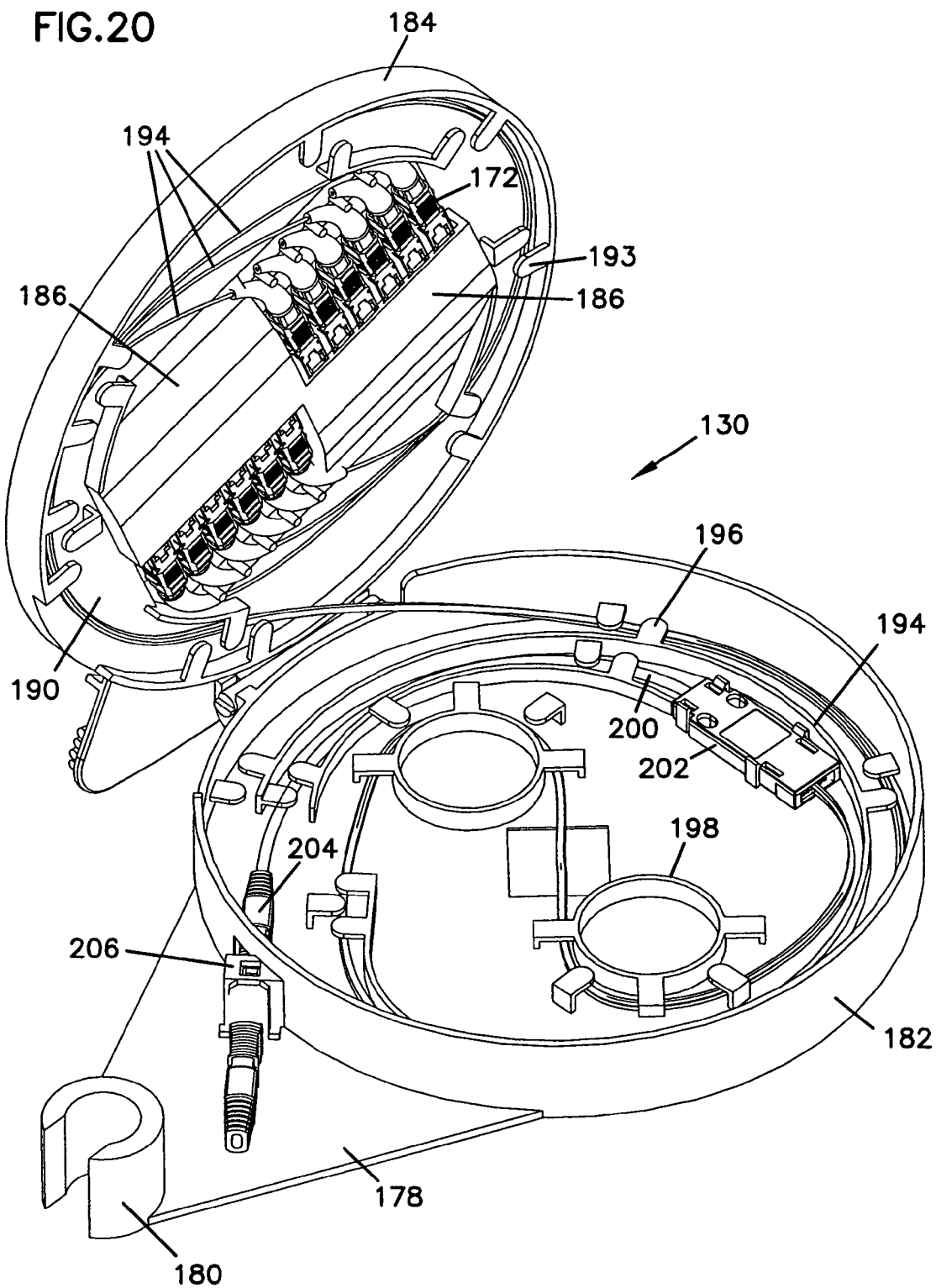
FIG. 20 is a top perspective view the adapter tray of FIG. 19, the adapter tray shown with the tray cover open.
Figure 21:
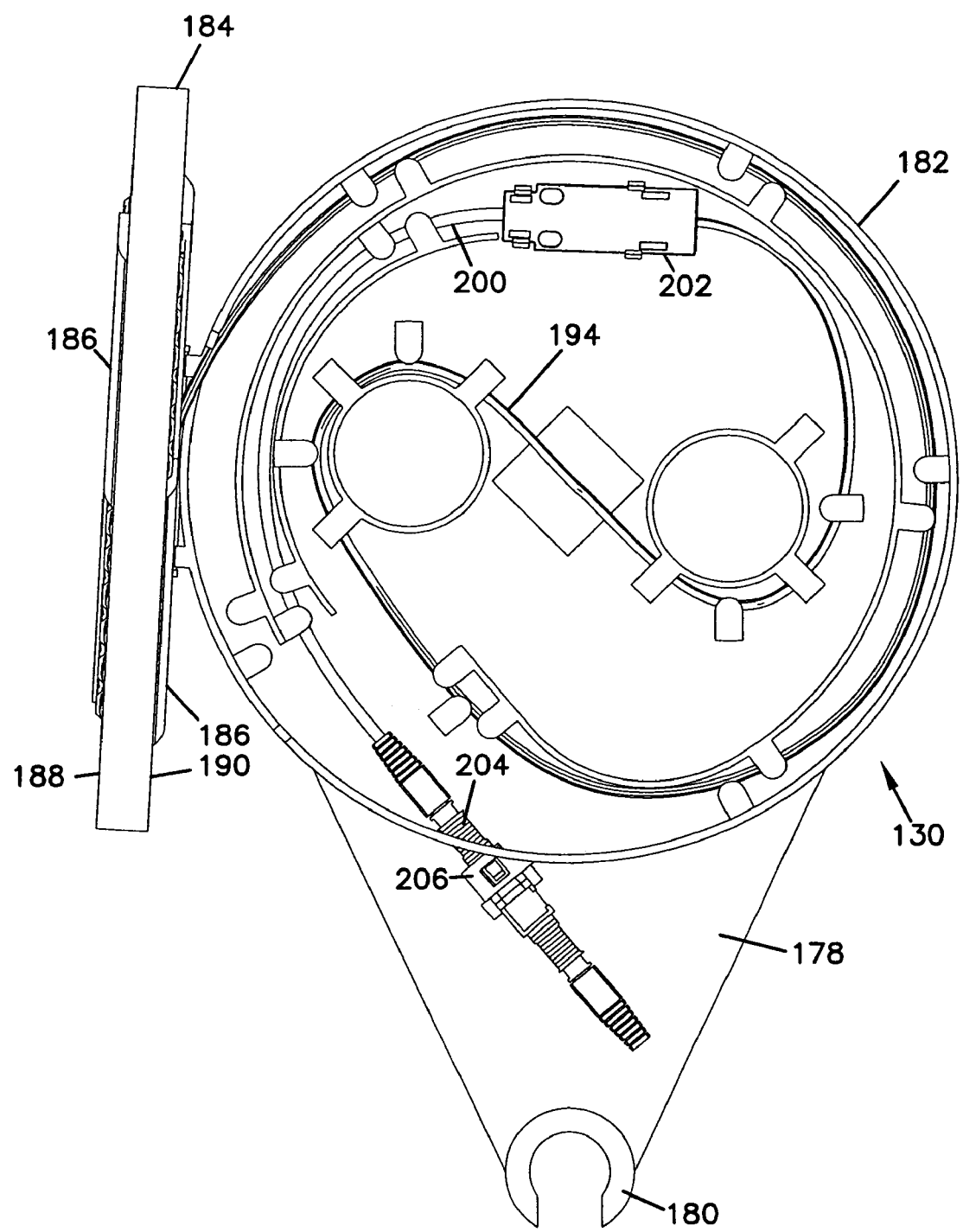
FIG. 21 is a top plan view the adapter tray of FIG. 20.
Figure 22:
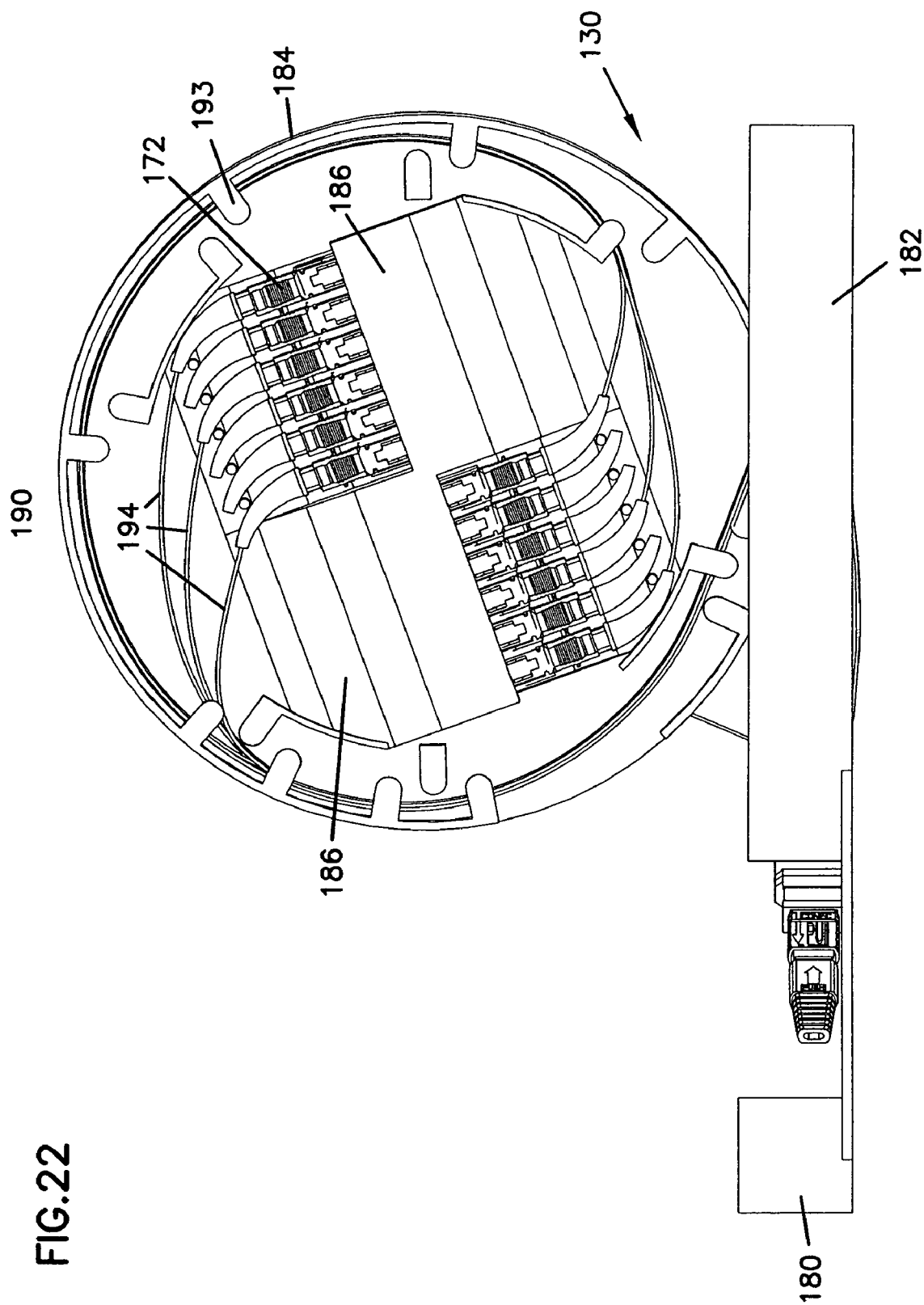
FIG. 22 is a side elevation view the adapter tray of FIG. 20.
Figure 27:
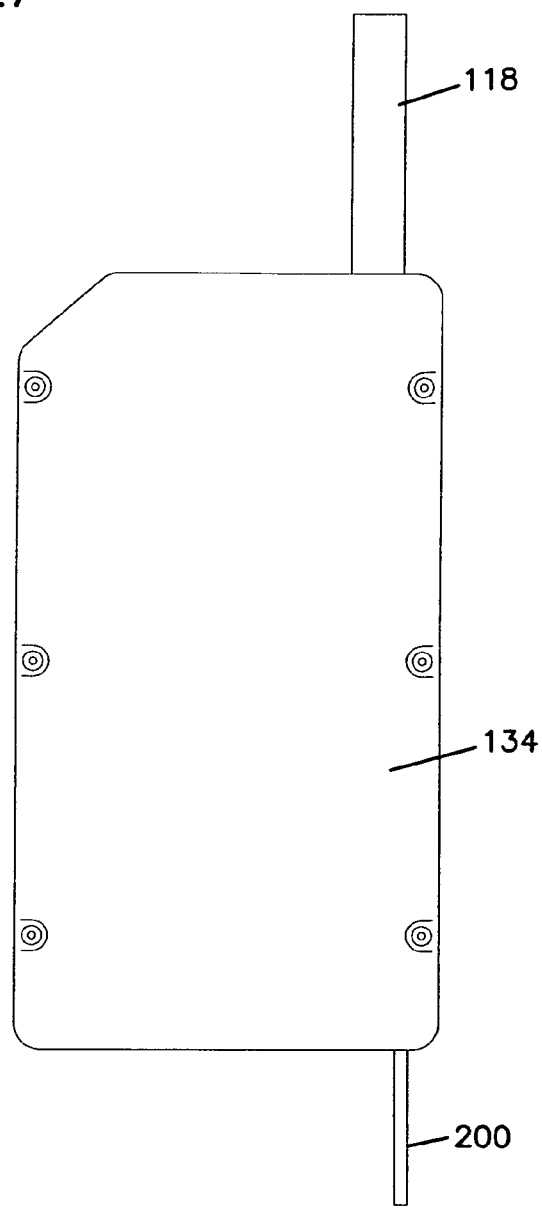
FIG. 27 is a front elevation view of the output cable housing of FIG. 23.
Figure 28:
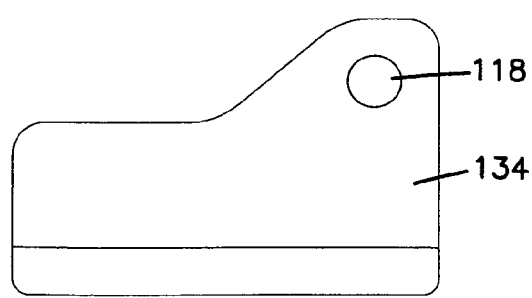
FIG. 28 is a top plan view of the output cable housing of FIG. 23.

Referring to FIGS. 20-22, connectorized customer equipment cables 194 are connected to adapter mounts 186 at lower side 190 of cover 184. Lower side 190 also includes fingers 193 for cable management. In this manner, an interconnection is provided between distribution cables 148 managed at upper side 188 of cover 184 and customer equipment cables 194 managed at lower side 190 of cover 184.

After a connection is established in adapter mounts 186, customer equipment cables 194 are led into base portion 182 of tray 130. Base portion 182 also includes cable storage and management structures. Customer equipment cables 194 are guided under fingers 196 in base 182 and looped around cable slack storage spools 198 before being formed into a ribbon cable 200 by a fan out 202. Multi-fiber ribbon cable 200 is terminated with a multi-fiber connector 204. Base 182 of tray 130 includes a multi-fiber adapter 206 which is used to relay multi-fiber cable 200 out of tray 130. Multi-fiber customer cables 200 coming out of trays 130 are guided through radius limiters 208 shown in FIG. 18 to output cable housing 134. In other embodiments, instead of utilizing a multi-fiber connector such as connector 204 or a multi-fiber adapter such as adapter 206, the multi-fiber ribbon cable 200 may be spliced to an output customer cable within tray 130.

Output cable housing 134 is illustrated in FIGS. 23-28. As shown in FIG. 9, multi-fiber customer equipment cables 200 coming from adapter trays 130 are directed into output cable housing 134 from a bottom side 210 of housing 134. Multi-fiber customer equipment cables 200 can then be spliced into main output cable 118. Main output cable 118 is directed out of an exit opening 212 defined at a top side 214 of output cable housing 134. Exit opening 212 is positioned to align with opening 114 on top wall 106 of enclosure 102. Output cable 118 is directed out of opening 114 to customer premises.

In another embodiment of the telecommunications cabinet, the adapter trays can be arranged such that they do not pivot in a generally perpendicular direction to a longitudinal axis A of the cabinet. In such an embodiment, the trays may be adjacently arranged at an angle relative to the longitudinal axis A of the cabinet. The adapter trays may have a curved profile instead of the flat profile of the adapter trays 130 shown in FIGS. 19-22. The curved adapter trays may follow a curved path of travel as they pivot out and in with respect to the cabinet. In such an arrangement, the overall length of the trays can be increased and the interior volume of the trays enlarged since the trays are adjacently arranged at an angle relative to the longitudinal axis A of the cabinet instead of being arranged at right angles to the longitudinal axis.

It should be noted that, for ease of illustration, only a number of the fiber optic cables have been shown in the figures. The above specification, examples and data provide a complete description of the manufacture and use of the invention. Since many embodiments of the invention can be made without departing from the spirit and scope of the invention, the invention resides in the claims hereinafter appended.

What is claimed is:

1. A telecommunications device including:
   a fixture defining a longitudinal axis;
   a fiber optic splitter mounted to the fixture, the fiber optic splitter configured to split a fiber optic signal carried by a first cable into a plurality of fiber optic signals carried by second cables;
   a plurality of adjacently positioned adapter trays mounted on the fixture, each adapter tray being pivotable about an axis generally parallel to the longitudinal axis of the fixture, each adapter tray housing a plurality of adapters for connecting the second cables to third cables, each adapter tray including a base and a cover for covering the base, the cover being pivotable between a closed position and an open position relative to the base, the cover including an adapter mount for mounting the plurality of adapters, wherein the base defines an interior volume for housing cables, wherein the cover includes an inner side that faces toward the interior volume of the base when the cover is in the closed position and the cover includes an outer side that faces away from the interior volume of the base when the cover is in the closed position, wherein a first end of each of the adapters mounted on the cover is exposed only to the outer side of the cover when the cover is in the closed position and the second opposite end of each of the adapters mounted on the cover is exposed only to the inner side of the cover when the cover is in the closed position, wherein at least a portion of the third cables are positioned in the interior volume defined by the base.

2. A telecommunications device according to claim 1, further including an excess cable storage structure for storing second cables that are not connected to the third cables by the adapters, the excess cable storage structure providing a termination location for the second cables without providing a continuous optical path for the fiber optic signals, the excess cable storage structure providing the termination location for the second cables without providing a continuous optical path for the fiber optic signals being positioned at a location outside of the plurality of adapter trays mounted to the fixture.

3. A telecommunications device according to claim 1, further comprising a cable manager including a first and a second plurality of radius limiters in a stacked arrangement, both of the first and second plurality of radius limiters positioned in stacks parallel to the longitudinal axis of the fixture.

4. A telecommunications device according to claim 1, wherein the cover is configured for mounting an even number of adapters, wherein one half of each of the adapters is covered by a portion of the cover so that only one end of each adapter is exposed to the outer side of the cover when the cover is in a closed position relative to the base.

5. A telecommunications device according to claim 1, wherein the fixture includes a longitudinally extending round shaft and wherein each of the plurality of adapter trays includes a C-shaped coupling member that is coupled to the round shaft of the fixture for pivotal movement.

6. A telecommunications device according to claim 1, wherein the adapters are for connecting SC type connectors.

7. A telecommunications device according to claim 1, wherein the adapter tray defines a generally circular shape.

8. A telecommunications device according to claim 1, wherein the base includes a cable management structure including a radius limiting spool and a plurality of fingers.

9. A telecommunications device according to claim 1, wherein each tray includes a multi-fiber adapter mounted thereon.

\* \* \* \* \*